US009440382B2

(12) United States Patent
Uehara et al.

(10) Patent No.: US 9,440,382 B2
(45) Date of Patent: Sep. 13, 2016

(54) METHOD OF MANUFACTURE OF POLYTETRAFLUOROETHYLENE STRETCHED FILM, AND POLYTETRAFLUOROETHYLENE STRETCHED FILM

(75) Inventors: Hiroki Uehara, Kiryu (JP); Takeshi Yamanobe, Kiryu (JP); Yasumasa Yukawa, Ichihara (JP); Yasuhiko Matsuoka, Ichihara (JP)

(73) Assignee: National University Corporation Gunma University, Gunma (JP)

( * ) Notice: Subject to any disclaimer, the term of this patent is extended or adjusted under 35 U.S.C. 154(b) by 554 days.

(21) Appl. No.: 13/818,651

(22) PCT Filed: Aug. 19, 2011

(86) PCT No.: PCT/JP2011/068752
§ 371 (c)(1),
(2), (4) Date: Feb. 22, 2013

(87) PCT Pub. No.: WO2012/026401
PCT Pub. Date: Mar. 1, 2012

(65) Prior Publication Data
US 2013/0158220 A1 Jun. 20, 2013

(30) Foreign Application Priority Data

Aug. 26, 2010 (JP) .................................. 2010-189636

(51) Int. Cl.
*B29C 43/14* (2006.01)
*B29C 55/00* (2006.01)
(Continued)

(52) U.S. Cl.
CPC ............. *B29C 43/14* (2013.01); *B29C 43/003* (2013.01); *B29C 43/006* (2013.01); *B29C 47/0057* (2013.01); *B29C 47/92* (2013.01); *B29C 55/00* (2013.01); *B29C 55/12* (2013.01);
(Continued)

(58) Field of Classification Search
None
See application file for complete search history.

(56) References Cited

U.S. PATENT DOCUMENTS 4,596,837 A * 6/1986 Yamamoto et al. .......... 521/145
4,820,787 A * 4/1989 Kataoka et al. .............. 526/255
(Continued)

FOREIGN PATENT DOCUMENTS

JP 1-247432 10/1989
JP 10-323890 12/1998
(Continued)

OTHER PUBLICATIONS

Morioka, Takashi et al., "Oriented Crystallization Induced by Uniaxial Drawings from Poly(tetrafluoroethylene) Melt", Macromolecules, 2007, 40, 9413-9419.

(Continued)

*Primary Examiner* — Jeffrey Wollschlager
(74) *Attorney, Agent, or Firm* — Nixon Peabody LLP; Khaled Shami

(57) ABSTRACT

A method of manufacturing a PTFE stretched film that has higher tensile strength at its breaking point. In the method, a resin composition is obtained by mixing an emulsion of PTFE (A) with a number average molecular weight of $5 \times 10^6$ or more and an emulsion of PTFE (B) with a number average molecular weight of $1 \times 10^6$ to $4 \times 10^6$ so that the solid content ratio (A/B) of the PTFE (A) and the PTFE (B) is 99/1 to 10/90. The mixed emulsion is subjected to compression molding in a melted state under a reduced-pressure atmosphere to obtain a film.

9 Claims, 5 Drawing Sheets

(51) Int. Cl.
  *B29C 55/12* (2006.01)
  *B29C 55/16* (2006.01)
  *B29C 43/00* (2006.01)
  *C08J 5/18* (2006.01)
  *C08L 27/18* (2006.01)
  *B29C 47/92* (2006.01)
  *B29C 43/36* (2006.01)
  *B29C 47/00* (2006.01)
  *B29C 43/56* (2006.01)
  *B29K 27/18* (2006.01)

(52) U.S. Cl.
  CPC ............... *B29C 55/16* (2013.01); *C08J 5/18* (2013.01); *C08L 27/18* (2013.01); *B29C 47/0004* (2013.01); *B29C 47/0026* (2013.01); *B29C 2043/3605* (2013.01); *B29C 2043/366* (2013.01); *B29C 2043/561* (2013.01); *B29C 2947/92266* (2013.01); *B29C 2947/92514* (2013.01); *B29C 2947/92704* (2013.01); *B29C 2947/92761* (2013.01); *B29K 2027/18* (2013.01); *B29K 2995/0053* (2013.01); *C08J 2327/18* (2013.01); *C08L 2205/02* (2013.01)

(56) References Cited

U.S. PATENT DOCUMENTS

| | | | | |
|---|---|---|---|---|
| 4,824,898 | A * | 4/1989 | Sukigara et al. | 524/401 |
| 5,102,921 | A * | 4/1992 | Harada et al. | 521/134 |
| 5,374,473 | A * | 12/1994 | Knox et al. | 428/218 |
| 5,420,191 | A * | 5/1995 | Howard et al. | 524/462 |
| 5,646,192 | A * | 7/1997 | Dolan et al. | 521/56 |
| 5,658,960 | A * | 8/1997 | Dolan | 521/57 |
| 5,708,044 | A * | 1/1998 | Branca | 521/145 |
| 6,207,091 | B1 * | 3/2001 | Kanamoto et al. | 264/173.11 |
| 6,987,224 | B2 * | 1/2006 | Yamamoto et al. | 174/36 |
| 7,276,287 | B2 * | 10/2007 | Smith et al. | 428/422 |
| 7,927,525 | B2 * | 4/2011 | Lizotte et al. | 264/127 |
| 2003/0062644 | A1 * | 4/2003 | Oyama et al. | 264/41 |
| 2007/0009727 | A1 * | 1/2007 | Sawada et al. | 428/304.4 |
| 2009/0072428 | A1 * | 3/2009 | Lizotte et al. | 264/101 |
| 2010/0006497 | A1 * | 1/2010 | Thottupurathu | 210/505 |

FOREIGN PATENT DOCUMENTS

| | | |
|---|---|---|
| JP | 11-35716 | 2/1999 |
| JP | 2001-357729 | 12/2001 |
| JP | 2005-306033 | 11/2005 |
| JP | 2008-55407 | 3/2008 |
| JP | 2008-260191 | 10/2008 |
| WO | WO2010098135 | * 9/2010 |

OTHER PUBLICATIONS

Suwa, Takeshi et al., "Melting and Crystallization Behavior of Poly(tetrafluoroethylene). New Method for Molecular Weight Measurement of Poly(tetrafluoroethylene) Using a Differential Scanning Calorimeter", Journal of Applied Polymer Science, vol. 17, pp. 3253-3257, 1973.

Polymer Preprints, Japan, vol. 54 (No. 2), pp. 3097-3098, 2005 (partial translation).

International Search Report for International Application No. PCT/JP2011/068752, mailed Nov. 22, 2011.

* cited by examiner

METHOD OF MANUFACTURE OF POLYTETRAFLUOROETHYLENE STRETCHED FILM, AND POLYTETRAFLUOROETHYLENE STRETCHED FILM

CROSS REFERENCE TO RELATED APPLICATIONS OR PRIORITY CLAIM

This application is a National Phase of PCT/JP2011/068752, filed Aug. 19, 2011, entitled, "Process For Manufacturing Stretched Polytetrafluoroethylene Film, And Stretched Polytetrafluoroethylene Film" which claims the benefit of Japanese Patent Application No. 2010-189636, filed Aug. 26, 2010, the contents of which are incorporated herein by reference in their entirety.

TECHNICAL FIELD

The present invention relates to a method of manufacture of polytetrafluoroethylene stretched film, and to polytetrafluoroethylene stretched film.

BACKGROUND ART

Polytetrafluoroethylene (hereinafter "PTFE") is used for various types of durable material due to its high melting point (approximately 330° C.), and excellent chemical stability and chemical resistance. Moreover, as it also has excellent weather resistance and water repellency, it is used as structural film material for dome roofs and the like. As its melt viscosity is very high, it is difficult to mold PTFE into film by melt molding such as extrusion molding. Conventionally, PTFE film is manufactured by the skiving technique in which film is shaved by the "katsuramuki" (rotary cutting) procedure—i.e., by shaving into thin-layered film form—from a block-shaped precursor obtained by sintering PTFE powder.

On the other hand, as a method for enhancing film strength, a method is known in which film that has once been molded is stretched to extend and orient the macromolecular chain forming the obtained film. However, with respect to PTFE film manufactured by the skiving technique, as the film breaks when it is stretched even at low stretching ratio, it has been difficult to sufficiently enhance strength by stretching.

As methods for obtaining high-strength PTFE film by stretching, for example, methods utilizing solid-state stretching have been disclosed in which stretching is conducted below the PTFE melting point, i.e., in a state where the PTFE is substantially unmelted. Specifically, the following methods (i) to (iii) may be cited.
 (i) A method in which film obtained by compression molding of PTFE powder at a temperature below the melting point thereof is stretched at a temperature where the obtained film does not substantially melt (Patent Document 1).
 (ii) A method in which PTFE powder to which lubricant has been added is extrusion molded and rolled to obtain a sheet, and porous film obtained from the said sheet by removal of the aforementioned lubricant is stretched at a temperature under the PTFE melting point, followed by being baked until it becomes non-porous (Patent Document 2).
 (iii) A method in which PTFE powder to which lubricant has been added is extrusion molded, and subjected to biaxial stretching below the PTFE melting point (Patent Document 3).

On the other hand, the present inventors hereby report the following method (iv).
 (iv) A method in which stretched film is obtained by melt stretching wherein PTFE film is stretched in a melted state (Non-Patent Documents 1 and 2). This focuses attention on the fact that PTFE has remarkably high viscosity at temperatures above the melting point, and attempts to conduct melt stretching that is infeasible with ordinary thermoplastic resin.

PRIOR ART REFERENCES

Patent Documents

Patent Document 1: Japanese Unexamined Patent Application, First Publication No. H10-323890
Patent Document 2: Japanese Unexamined Patent Application, First Publication No. 2005-306033
Patent Document 3: Japanese Unexamined Patent Application, First Publication No. 2008-55407

Non-Patent Documents

Non-Patent Document 1: 54$^{th}$ Society of Polymer Science Roundtable, Vol. 54 (No. 2), page 3097, 2005.
Non-Patent Document 2: Morioka, T.; Kakiage, M; Yamanobe, T.; Komoto, T.; Higuchi, Y.; Kamiya, H.; Arai, K; Murakami, S.; Uehara, H. Macromolecules 2007, 40, 9413-9419.

SUMMARY OF THE INVENTION

Problems that the Invention is to Solve

Higher strengths are obtained with methods (i)-(iv) than with film manufactured by the skiving technique. However, particularly high tensile strengths at break are often required for PTFE film used in applications such as dome roofing material, and further improvement is therefore required.
The object of the present invention is to provide a method of manufacture of PTFE stretched film that has higher tensile strength at break, and PTFE stretched film obtained by the pertinent manufacturing method.

Means for Solving the Problems

The present invention adopts the following configuration to solve the aforementioned problem.
 [1] A method of manufacture of PTFE stretched film having the following steps (I) and (II).
   (I) A step in which a resin composition obtained by mixing an emulsion of PTFE (A) with a number average molecular weight of 5×10$^6$ or more and an emulsion of PTFE (B) with a number average molecular weight of 1×10$^6$ to 4×10$^6$ so that the solid content ratio (A/B) of the PTFE (A) and the PTFE (B) is 99/1 to 10/90 is subjected to compression molding in a melted state under a reduced-pressure atmosphere to obtain a film.
   (II) A step in which the aforementioned film is melt stretched.
 [2] The method of manufacture of PTFE stretched film according to [1], wherein the aforementioned step (I) has a step (I-1) in which the aforementioned resin composition is pressed in a state where it has been heated to a temperature below the melting point under a reduced-pressure atmosphere, and a step (I-2) in which the heated and pressed resin composition is further heated to a melted state, and compression molded at a higher pressure than the pressing of the aforementioned step (I-1).

[3] A method of manufacture of polytetrafluoroethylene stretched film according to [2], wherein the aforementioned step (I) additionally has a step (I-3) in which molded film is obtained by allowing cooling to being kept in a pressed state under a reduced-pressure atmosphere.

[4] The method of manufacture of polytetrafluoroethylene stretched film according to any one of [1] to [3], wherein the average particle size of the polytetrafluoroethylene (A) in the emulsion of polytetrafluoroethylene (A) is 0.03-0.5 μm, and the average particle size of the polytetrafluoroethylene (B) in the emulsion of polytetrafluoroethylene (B) is 0.03-0.5 μm.

[5] The method of manufacture of polytetrafluoroethylene stretched film according to any one of [1] to [4], wherein the aforementioned reduced-pressure atmosphere is a reduced-pressure atmosphere of 10 Torr or less.

[6] The method of manufacture of polytetrafluoroethylene stretched film according to any one of [1] to [5], wherein the temperature at which the resin composition in the aforementioned step (I) is on a solid state is 15-150° C.

[7] The method of manufacture of polytetrafluoroethylene stretched film according to any one of [1] to [6], wherein the temperature at which the resin composition in the aforementioned step (I) is in a melted state is 330-420° C.

[8] The method of manufacture of polytetrafluoroethylene stretched film according to any one of [1] to [7], wherein the pre-melted resin composition used in the aforementioned step (I) is in powder form.

[9] The method of manufacture of polytetrafluoroethylene stretched film according to any one of [1] to [8], wherein the aforementioned polytetrafluoroethylene (A) and polytetrafluoroethylene (B) are polytetrafluoroethylene obtained by emulsion polymerization.

[10] The method of manufacture of PTFE stretched film according to [9], wherein the polymerization temperature is 10-95° C., polymerization pressure is 0.5-4.0 MPa, and polymerization time is 90-520 minutes in the aforementioned emulsion polymerization.

[11] The method of manufacture of polytetrafluoroethylene stretched film according to any one of [1] to [10], wherein the temperature at which the film is in a melted state in the aforementioned step (II) is 330-420° C.

[12] The method of manufacture of polytetrafluoroethylene stretched film according to any one of [1] to [8], wherein the aforementioned melt stretching is biaxial stretching.

[13] The method of manufacture of polytetrafluoroethylene stretched film according to [12], wherein the aforementioned biaxial stretching is simultaneous biaxial stretching in which the aforementioned film is in a melted state by hot-air blowing, and two axes are simultaneously stretched.

[14] The method of manufacture of polytetrafluoroethylene stretched film according to [13], wherein the stretching ratio is 2.5-fold or more in the aforementioned simultaneous biaxial stretching.

[15] Polytetrafluoroethylene stretched film, which is manufactured by the polytetrafluoroethylene stretched film manufacturing method according to any one of [1] to [14], and in which haze is 50% or less, and tensile strength at break is 30 MPa or more.

Effects of the Invention

According to the manufacturing method of the present invention, PTFE stretched film of high tensile strength at break is obtained.

The tensile strength at break of the PTFE stretched film of the present invention is high.

MODE FOR CARRYING OUT THE INVENTION

Figure 1:
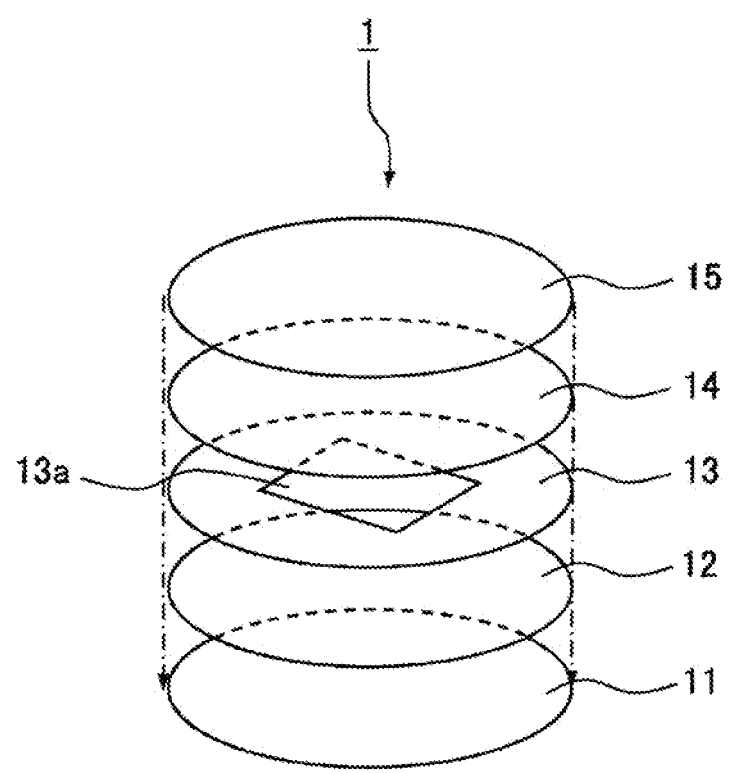
FIG. 1 is an exploded perspective view which shows one example of step (I) of the present invention.

Method of Manufacture of PTFE Stretched Film

The method of manufacture of PTFE stretched film of the present invention is a method which has the following steps (I) and (II).

(I) A step in which a resin composition obtained by mixing an emulsion of PTFE (A) with a number average molecular weight of $5 \times 10^6$ or more and an emulsion of PTFE (B) with a number average molecular weight of $1 \times 10^6$ to $4 \times 10^6$ so that the solid content ratio (A/B) of the PTFE (A) and the PTFE (B) is 99/1 to 10/90 is subjected to compression molding in a melted state under a reduced-pressure atmosphere to obtain a film.

(II) A step in which the aforementioned film is melt stretched.

(Resin Composition)

The resin composition is obtained by mixing an emulsion of PTFE (A) with a number average molecular weight of $5 \times 10^6$ or more and an emulsion of PTFE (B) with a number average molecular weight of $1 \times 10^6$ to $4 \times 10^6$, and by aggregating and drying the mixture.

The solid content ratio (A/B) of the PTFE (A) and the PTFE (B) in the mixture of the emulsion of the PTFE (A) and the emulsion of the PTFE (B) is 99/1 to 10/90, preferably 95/5 to 20/80, and more preferably 90/10 to 40/60.

In addition to homopolymers of tetrafluoroethylene (hereinafter "TFE"), the PTFE (A) and the PTFE (B) also contain modified PTFE. Modified PTFE is a copolymer obtained by copolymerizing a fluorine-containing comonomer in TFE to an extent that does not impart a capacity for melt molding such as extrusion molding and injection molding.

As the aforementioned fluorine-containing comonomer, one may cite, for example, one or more comonomers selected from among vinylidene fluoride (VdF), hexafluoropropylene (HFP), perfluoro(alkylvinyl ether) (PFAVE), chlorotrifluoroethylene (CTFE), polyfluoroalkyl ethylene, perfluoro-2,2-dimethyl-1,3-dioxole, perfluoro-4-alkyl-1,3-dioxole, and $CF_2=CFO(CF_2)_nCF=CF_2$ (in the formula, n is 1 or 2).

In the case where the PTFE (A) is modified PTFE, the proportion of repeating units based on the fluorine-containing comonomer relative to all repeating units is preferably 0.5 mass % or less, and more preferably 0.4 mass % or less from the standpoint of maintaining the characteristic heat resistance, weather resistance, and water repellency of PTFE.

In the case where the PTFE (B) is modified PTFE, the proportion of repeating units based on the fluorine-containing comonomer relative to all repeating units is preferably 0.5 mass % or less, and more preferably 0.4 mass % or less from the standpoint of maintaining the characteristic heat resistance, weather resistance, and water repellency of PTFE.

The number average molecular weight (hereinafter "Mn") of the PTFE (A) is $5 \times 10^6$ or more, preferably $5 \times 10^6$ to $5 \times 10^7$, and more preferably $5 \times 10^6$ to $2 \times 10^7$. If the Mn of the PTFE (A) is $5 \times 10^6$ or more, PTFE stretched film of high tensile strength at break is obtained. Moreover, if the Mn of the PTFE (A) is $5 \times 10^7$ or less, melt viscosity is not excessively high, and the melt stretching of step (II) is facilitated.

Otherwise, Mn in this specification is molecular weight obtained according to the method recorded in the below-mentioned document from crystallization heat estimated by the cooling measurement after PTFE material is melted in a differential scanning calorimeter (DSC).

Document: Suwa, T.; Takehisa, M.; Machi, S., J. Appl. Polym. Sci. vol. 17, p. 3253 (1973).

The average particle size of the PTFE (A) in the emulsion of the PTFE (A) is preferably 0.03 to 0.5 µm, and more preferably 0.04 to 0.4 µm. If the average particle size of the PTFE (A) is 0.03 µm or more, obtainment of high-strength PTFE stretched film is facilitated. If the average particle size of the PTFE (A) is 0.5 µm or less, break of the film during stretching is inhibited.

The average particle size of the PTFE (A) is measured by spectrophotometer.

The solid content concentration of the PTFE (A) in the emulsion of the PTFE (A) is preferably 3 to 50 mass %, more preferably 4 to 45 mass %, and still more preferably 5 to 40 mass %.

The Mn of the PTFE (B) is $1 \times 10^6$ to $4 \times 10^6$, preferably $1.2 \times 10^6$ to $3.5 \times 10^6$, and more preferably $1.5 \times 10^6$ to $3 \times 10^6$. If the Mn of the PTFE (B) is $1 \times 10^6$ or more, the strength of the PTFE stretched film can be maintained at a high level. If the Mn of the PTFE (B) is $4 \times 10^6$ or less, molded film that is easily stretchable is obtained.

The average particle size of the PTFE (B) in the emulsion of the PTFE (B) is preferably 0.03 to 0.5 µm, and more preferably 0.04 to 0.4 µm. If the average particle size of the PTFE (B) is 0.03 µm or more, obtainment of high-strength PTFE stretched film is facilitated. If the average particle size of the PTFE (B) is 0.5 µm or less, break of the film during stretching is inhibited The average particle size of the PTFE (B) is measured by spectrophotometer.

The solid content concentration of the PTFE (B) in the emulsion of the PTFE (B) is preferably 3 to 50 mass %, more preferably 4 to 45 mass %, and still more preferably 5 to 40 mass %.

With respect to the PTFE (A) and the PTFE (B), PTFE obtained by emulsion polymerization is preferable from the standpoint of facilitating obtainment of PTFE stretched film of high tensile strength at break. Moreover, as emulsions of the PTFE (A) and the PTFE (B) are obtained if the PTFE (A) and the PTFE (B) are manufactured by emulsion polymerization, the resin composition can be prepared by mixing these emulsions even without separately conducting dispersion treatment.

As emulsion polymerization, one may cite, for example, a method of conducting polymerization of a monomer composition including the indispensable component of TFE in the presence of water, fluorine-containing surfactant, radical polymerization initiator, and paraffin wax stabilizer, and including fluorine-containing comonomer as necessary.

As the fluorine-containing surfactant, an anionic fluorine-containing surfactant is preferable. As anionic fluorine-containing surfactant, it is preferable to use, for example, the compound shown in the following formula (1) (hereinafter "Compound (1)").

$$R^1\text{—COOX} \qquad (1)$$

(Provided that in formula (1), $R^1$ is a straight-chain or branched alkyl group, a straight-chain or branched alkenyl group, or a cyclic alkyl group with a carbon number from 5 to 9, in which 90-100% of hydrogen atoms are replaced by fluorine atoms (provided that the pertinent alkyl group, alkenyl group, or cyclic alkyl group may have one or two ether oxygen atoms), and X is —$NH_4$, a hydrogen atom, or an alkali metal.)

With respect to compound (1), from the standpoint of excellent solubility in water without risk of metal ion components remaining in the PTFE (A) and the PTFE (B) as impurities, X is preferably an ammonium salt that is —$NH_4$. Specifically, one may cite $C_2F_5OC_2F_4OC_2F_4COONH_4$ (hereinafter "EEA"), $C_7F_{15}COONH_4$ (hereinafter "APFO"), $HC_7F_{14}COONH_4$, $C_6F_{13}COONH_4$, $C_6F_{12}COONH_4$, $C_8F_{17}COONH_4$, $C_4F_9OC_2F_4OONH_4$, and the like. Among these, EEA or APFO is particularly preferable from the standpoint of polymerization process stability.

With respect to the amount of fluorine-containing surfactant that is used relative to the total amount of PTFE that is produced, 0.05-1.0 mass % is preferable, 0.1-0.8 mass % is more preferable, and 0.15-0.6 mass % is particularly preferable.

As the radical polymerization initiator, one may cite, for example, persulfates such as ammonium persulfate and potassium persulfate; aqueous organic peroxides such as disuccinic acid peroxide, diglutaric acid peroxide, and tert-butylhydroperoxide; and redox polymerization initiators obtained from a combination of a reducing agent and chlorate, bromate, or permanganate.

The amount of radical polymerization initiator that is used relative to the total amount of monomer that is used in polymerization is preferably 0.01-0.20 mass %, and more preferably 0.01-0.15 mass %.

The paraffin wax stabilizer is preferably refined wax with a melting point of 30-99° C., more preferably refined wax with a melting point of 40-80° C., and still more preferably refined wax with a melting point of 45-70° C.

The amount of paraffin wax stabilizer that is used relative to the total amount of water that is used is preferably 0.1-12 mass %, and more preferably 0.1-8 mass %.

The polymerization temperature of emulsion polymerization is preferably 10-95° C., and more preferably 15-90° C.

Polymerization pressure is preferably 0.5-4.0 MPa, and more preferably 0.6-3.5 MPa.

Polymerization time is preferably 90-520 minutes, and more preferably 90-450 minutes.

By mixing the emulsion of PTFE (A) and the emulsion of PTFE (B), and by subsequently aggregating and drying the mixed emulsion, a resin composition powder is obtained in which PTFE (A) and PTFE (B) are mixed on the secondary particle level.

As the aggregation method, a known method may be adopted. For example, a resin composition may be aggregated by diluting the mixed emulsion with water so that the total concentration of PTFE (A) and PTFE (B) in the mixed emulsion (100 mass %) is 8-20 mass %, and subsequently conducting vigorous agitation.

During aggregation, the pH of the mixed emulsion may be adjusted as necessary, and coagulants such as electrolyte and water-soluble organic solvents may be added.

As pH adjusters, one may cite sodium carbonate and sodium hydrogen carbonate.

As electrolyte, one may cite inorganic salts such as potassium nitrate, sodium nitrate, sodium carbonate, and sodium hydrogen carbonate.

As water-soluble organic solvent, one may cite alcohols, acetones, and the like.

After aggregation of the resin composition, agitation is suitably conducted to separate the aggregated resin composition from the water, and granulation and particle size adjustment are conducted to obtain a resin composition in a moist condition. Granulation is considered as the process in which the average particle size of the resin composition is grown to 100 μm, and particle size adjustment is considered as the process in which particle characteristics and particle size distribution are regulated by continued agitation.

Next, the moist resin composition that has been separated from the mixed emulsion is dried.

The drying temperature of the moist resin composition is preferably 110-250° C., and more preferably 120-230° C.

The average particle size of the resin composition is preferably 0.001-1 mm. If the average particle size of the resin composition is 0.001 mm or more, obtainment of the resin composition is facilitated, and if the average particle size of the resin composition is 1 mm or less, uniform arrangement of the resin composition during compression molding is facilitated.

The average particle size of the resin composition is measured by laser particle size analyzer.

(Step (I))

With respect to step (I), from the standpoint of facilitating obtainment of PTFE stretched film of high tensile strength at break particularly in the case where biaxial stretching is conducted in the following step (II), a step including the following steps (I-1) and (I-2) is preferable, and a step including the following steps (I-1) to (I-3) is more preferable.

(I-1) A step in which the resin composition is pressed in a state where it is heated to below the melting point under a reduced-pressure atmosphere.

(I-2) A step in which the resin composition that has been heated and pressed is further heated to a melted state, and compression molding is conducted under a reduced-pressure atmosphere at a pressure that is higher than that of the pressing of step (I-1).

(I-3) A step in which molded film is obtained by allowing cooling while a pressed state is maintained under a reduced-pressure atmosphere.

Step (I) can be carried out using a compression molding apparatus. As the compression molding apparatus, for example, one may use a vacuum pressing machine obtained by installing a pressing machine inside a vacuum chamber. Below, a description is given of steps (I-1) to (I-3) using a vacuum pressing machine as one example. In the following description, the pressure at which the resin composition is pressed in step (I-1) is considered as a first pressure $V_1$ (unit: MPa), and the pressure at which the resin composition is pressed in step (I-2) is considered as a second pressure $V_2$ (unit: MPa).

Step (I-1):

As shown in FIG. 1, a releasable polyimide film 12 is placed on top of a stainless steel plate 11, and a stainless steel plate 13 in which an opening 13a of desired shape is formed is additionally placed thereon. Next, after injecting a prescribed amount of resin composition into the opening 13a, a releasable polyimide film 14 is placed on top of the stainless steel plate 13, and a stainless steel plate 15 is additionally placed thereon to obtain a film molding laminate 1. Next, the laminate 1 is disposed at room temperature between a top plate and a bottom plate of the pressing machine installed inside the vacuum chamber, a reduced-pressure atmosphere is obtained by reducing pressure inside the vacuum chamber, and the top plate and the bottom plate of the pressing machine are brought together to a point where they make contact without exerting pressure on the laminate 1, after which the laminate 1 is heated to a prescribed temperature below the melting point of the resin composition by heating the said top plate and bottom plate, and the resin composition is subsequently pressed by the pressing machine at the first pressure $V_1$.

By pressing the resin composition in a state where it has been heated to below the melting point, the air among the raw material particles can be efficiently removed, facilitating obtainment of a uniform molded film without interstices. The melting point of the resin composition is measured by a differential scanning calorimeter (DSC).

As to the state of the resin composition that is injected into the opening 13a, one may cite, for example, powdery, clumpy, and other forms. A powdery form is preferable from the standpoints of excellent treatability and highly efficient deaeration of the resin composition.

As to the amount of resin composition injected into the opening 13a, an amount with which the ratio of a volume $V_A$ of the injected resin composition and a capacity $V_B$ of the opening 13a ($V_A/V_B$) is 1-10 is preferable. If the aforementioned ratio ($V_A/V_B$) is 1 or more, adhesiveness among the raw materials is satisfactory, and obtainment of high-strength molded film suitable for melt stretching at high stretching ratio is facilitated. If the aforementioned ratio ($V_A/V_B$) is 10 or less, manufacture of molded film by compression molding is facilitated.

From the standpoint of highly efficient deaeration of the resin composition, the pressure of the reduced-pressure atmosphere inside the vacuum chamber is preferably 10 Torr (approximately 1.33 kPa) or less, and more preferably 1 Torr (approximately $1.33 \times 10^2$ Pa) or less. As film molding is possible even with an ordinary press molding machine by attachment of a vacuum pump such as a rotary pump, the pressure of the reduced-pressure atmosphere is preferably $1 \times 10^{-3}$ Torr (approximately 0.13 Pa) or more, and more preferably $1 \times 10^{-2}$ Torr (approximately 1.33 Pa) or more.

The ambient temperature of the resin composition during heating (the ambient temperature of the resin composition in step (I-1), i.e., the temperature at which the resin composition is in a solid state in step (I-1) is hereinafter referred to as "temperature $T_1$") is below the PTFE melting point.

If the temperature $T_1$ is below the PTFE melting point, the raw material powder itself undergoes plastic deformation, because the raw material powder is in a solid state (below the melting point), with the result that the air in the raw material powder can be efficiently removed. The temperature $T_1$ is preferably 15-150° C., and more preferably 60-120° C.

The heating of the resin composition may be conducted by heating the stainless steel plates 11, 13 and 15, conducting laser irradiation with infrared rays or the like, conducting hot-air blowing, and so on.

There no particular limitations on the order of heating operations and pressure reduction operations within the vacuum chamber. The resin composition may be heated after pressure has been reduced in the vacuum chamber, or pressure may be reduced in the vacuum chamber after the resin composition has been heated, or the resin composition may be heated while pressure is being reduced in the vacuum chamber.

The first pressure $V_1$ is preferably 0.01-100 MPa, more preferably 0.01-50 MPa, and more preferably 0.1-10 MPa. If the first pressure $V_1$ is at or above 0.01 MPa, high-strength molded film is obtained which does not easily break in step (II), facilitating obtainment of PTFE stretched film of high tensile strength at break. If the first pressure $V_1$ is 0.1 MPa or more, a more stable obtainment of PTFE stretched film of high tensile strength at break is facilitated. If the first pressure $V_1$ is 100 MPa or less, it is possible to use a press molding machine that does not have any special mechanisms.

The first pressure $V_1$ in step (I-1) may be varied by raising and lowering the pressure within the aforementioned range during the step. However, from the standpoint of facilitating stable obtainment of molded film having fixed properties, it is preferable to maintain the first pressure $V_1$ at a fixed pressure within the aforementioned range.

The time for which the resin composition is pressed at the first pressure $V_1$ in a state where it has been heated at the temperature $T_1$ is preferably 1-100 minutes, and more preferably 5-60 minutes. If the aforementioned time is 1 minute or more, the efficiency of deaeration in the said resin composition is enhanced, and obtainment of high-strength molded film with satisfactory adhesiveness among the raw material particles is facilitated. If the aforementioned time is 100 minutes or less, productivity is enhanced.

Step (I-2):

Compression molding into film form is carried out by conducting additional heating so that the ambient temperature of the heated and pressed resin composition under a reduced-pressure atmosphere (the ambient temperature of the resin composition in step (I-2), i.e., the temperature at which the resin composition is in a melted state in step (I-2) is hereinafter referred to as "temperature $T_2$") rises above the melting point of the resin composition, pressing the resin composition by the pressing machine at the second pressure $V_2$ in a state where the resin composition is melted, and maintaining this for a fixed period of time.

The preferred range of pressure in a reduced-pressure atmosphere in step (I-2) is identical to the preferred range of pressure in a reduced-pressure atmosphere in step (I-1).

The temperature $T_2$ is preferably 330-420° C., and more preferably 350-400° C. If the temperature $T_2$ is 330° C. or more, obtainment of molded film in which the raw material powders of the resin composition are fused by pressing to enable melt stretching is facilitated. If the temperature $T_2$ is 420° C. or less, inhibition of degradation of the resin composition due to thermal decomposition is facilitated.

The second pressure $V_2$ is preferably 0.1-100 MPa, and more preferably 1-50 MPa.

If the second pressure $V_2$ is 0.1 MPa or more, the adhesiveness among the raw materials is satisfactory, and obtainment of high-strength molded film is facilitated. If the second pressure $V_2$ is 100 MPa or less, it is possible to use a press molding machine that does not have any special mechanisms.

The second pressure $V_2$ in step (I-2) may be varied by raising and lowering the pressure within the aforementioned range during the step. However, from the standpoints of facilitating stable obtainment of molded film having fixed properties, and facilitating manufacture thereof, it is preferable to maintain the second pressure $V_2$ at a fixed pressure within the aforementioned range.

As step (I-2) is a step for obtaining uniform film by enhancing adhesiveness among the raw material particles of the resin composition by compression, the second pressure $V_2$ of step (I-2) is preferably higher than the first pressure $V_1$ of step (I-1). The difference of the second pressure $V_2$ and the first pressure $V_1$ ($V_2-V_1$) is preferably 0.1-99 MPa, and more preferably 1-50 MPa. If the difference ($V_2-V_1$) is 0.1 MPa or more, the resin composition obtained in step (I-1) can be easily molded into film form in a melted state. If the difference ($V_2-V_1$) is 99 MPa or less, it is possible to use a press molding machine that does not have any special mechanisms.

The time for which compression is conducted by pressing the resin composition at the second pressure $V_2$ in a state where it is maintained at the temperature $T_2$ is preferably 1-100 minutes. If the compression time is 1 minute or more, adhesiveness among the raw materials is satisfactory, and obtainment of high-strength molded film is facilitated. If the compression time is 100 minutes or less, productivity is enhanced.

Step (I-3):

By allowing cooling in a state where pressing is conducted at the second pressure $V_2$ by the pressing machine in a reduced-pressure atmosphere, the resin composition that is compressed into film form is solidified by cooling below the melting point, preferably to room temperature. The laminate 1 that is extracted from the interior of the vacuum chamber is then delaminated to obtain the molded film. By this means, molded film containing the PTFE (A) and the PTFE (B) is obtained.

The thickness of the molded film is preferably 0.01-100 mm, and more preferably 0.1-10 mm. If the thickness of the molded film and 0.01 mm or more, adhesiveness among the raw materials is enhanced.

If the thickness of the molded film is 100 mm or less, melt stretching of molded film is facilitated. The thickness of the molded film may be adjusted according to the thickness of the stainless steel plate 13 and the amount of resin composition injected into the opening 13a.

There are no particular limitations on the form of the molded film, provided that it is a form adapted to the application of the PTFE stretched film manufactured by the manufacturing method of the present invention. The form of the molded film may be given the design form by adjusting the shape of the opening 13a of the stainless steel plate 13.

As stated above, the process from the aforementioned step (I-1) to step (I-3) is conducted in a reduced-pressure atmosphere.

By this means, the resin composition can be deaerated, and infiltration of air into the molded film can be prevented. As a result, the adhesiveness between the PTFEs in the molded film is satisfactory, and molded film is obtained which does not easily break in the melt stretching of the below-mentioned step (II).

In the aforementioned steps (I-1) to (I-3), after pressing the resin composition in a state where it has been heated below the melting point, the said resin composition is melted at a higher temperature, and a higher pressure is applied in a melted state to conduct compression molding into film form. By this means, adhesiveness among the raw material particles of the resin composition is enhanced, and molded film of higher strength is obtained compared to the case where the resin composition is melted in an unpressed state.

Consequently, the obtained molded film can be melt stretched at high stretching ratio without break in step (II) to obtain PTFE stretched film of higher tensile strength at break. Moreover, as adhesiveness among the raw materials is enhanced by melting the resin composition in a pressed state, inhibition of increased porosity due to flaking between the raw materials during biaxial stretching in step (II) is particularly facilitated, and the transparency of the obtained PTFE stretched film is enhanced.

Step (I) of the present invention is not limited to the aforementioned steps (I-1) to (I-3). For example, particularly in the case where uniaxial stretching is conducted in step (II), it is acceptable to omit step (I-1), and conduct only steps (I-2) and (I-3).

There are no limitations on the method of use of the aforementioned laminate 1. For example, in the present embodiment, the stainless steel plate 11, releasable polyimide film 12, stainless steel plate 13, releasable polyimide film 14, and stainless steel plate 15 are all discoid, but their shapes may also be other than discoid. In the present embodiment, the opening 13a is rectangular, but its shape may also be other than rectangular. It is also acceptable to use a laminate in which the resin composition is interposed between two releasable polyimide films without the discoid stainless steel plate 13 forming the opening 13a. It is also acceptable to use a mold which has a film-shaped opening. If the film does not adhere to the substrate or mold of stainless steel or the like, there is no need to use releasable polyimide film. With respect to the releasable material, apart from polyimide film, a polymer, metal or the like that does not come apart until 400° C. may be suitably used. Moreover, after conducting step (I-1), it is also acceptable to extract the resin composition, and conduct rolling in a melted state as step (I-2).

(Step (II))

Figure 2:
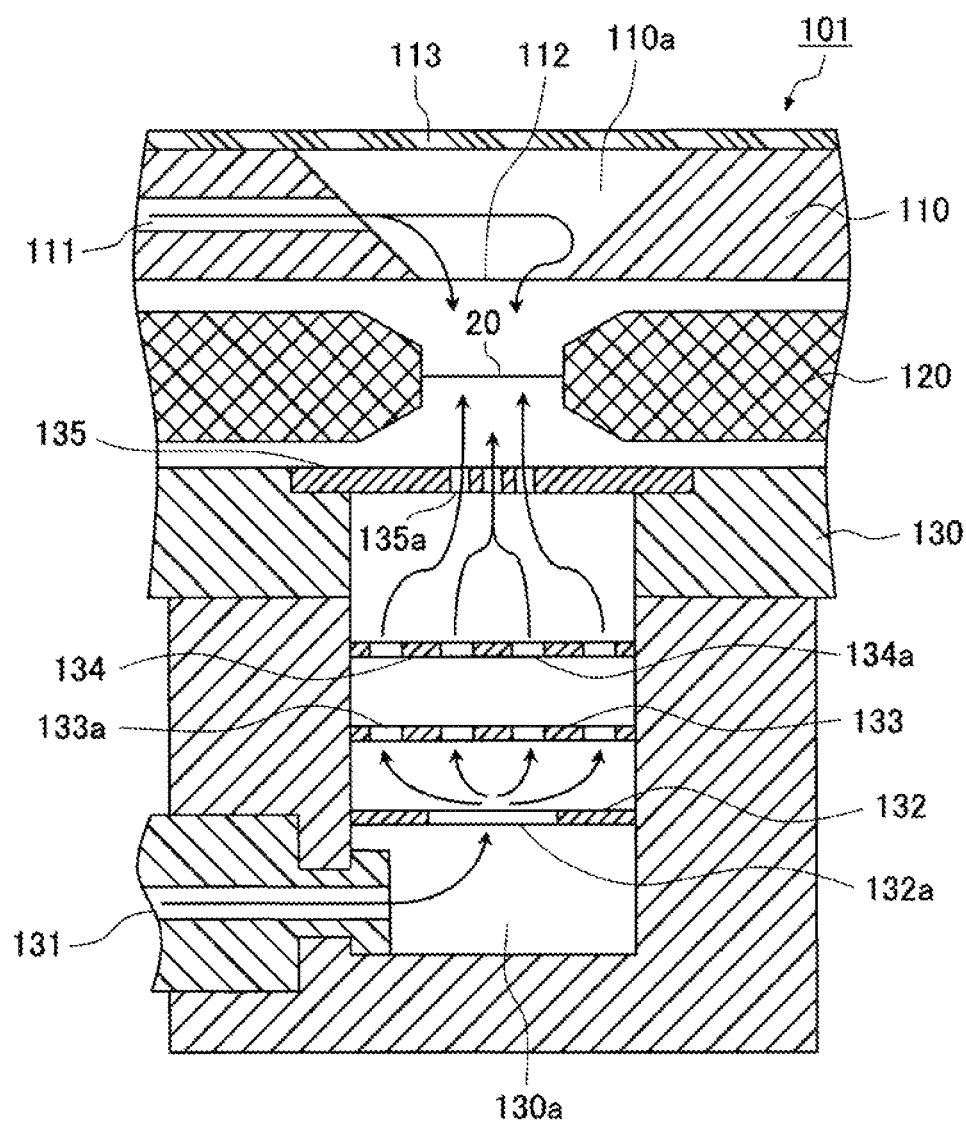
FIG. 2 is a vertical cross-sectional view which shows one example of a stretching machine used in step (II) of the present invention.

For example, the molded film obtained in step (I) is stretched in a state where it has been melted by hot-air blowing by a chuck-type stretching machine 101 illustrated in FIG. 2. As the molded film containing PTFE (A) and PTFE (B) is a molded resin product of ultra-high molecular weight with a number average molecular weight of $1 \times 10^6$ or more, it has a high melt viscosity, and can be stretched while maintaining its film shape even in a melted state.

As shown in FIG. 2, the stretching machine 101 is provided with an upper hot-air blowing unit 110 (hereinafter "blowing unit 110"), a chuck unit 120 which grips a molded film 20, and a lower hot-air blowing unit 130 (hereinafter "blowing unit 130").

The chuck unit 120 grips the molded film 20, and is the component which draws and stretches the melted molded film. The chuck unit 120 respectively grips the four corners of the molded film 20 with four chucks on the same horizontal plane (a plane that is perpendicular to FIG. 2), and is capable of biaxially stretching the molded film 20 in the vertical and horizontal directions by respectively drawing apart these chucks in the diagonal directions of the molded film 20.

The blowing unit 110 is the component which blows hot air onto the molded film 20 from above. The blowing unit 110 is provided with a hot-air inlet 111 which introduces hot air into an interior 110a, and a blow port 112 which blows out the hot air, and is provided at the top with a transparent cover 113. The shape of the interior 110a of the blowing unit 110 is formed so that it narrows as the molded film 20 side is approached.

In the blowing unit 110, hot air is directed to the interior 110a from the hot-air inlet 111, and is blown out from the blow port 112 toward the molded film 20. Due to the tapered shape of the interior 110a of the blowing unit 110 in the stretching machine 101, the hot air that is discharged from the blow port 112 is not blown to the portions of the molded film 20 gripped by the chuck unit 120 and their vicinity, and hot air is blown only to the central region of the molded film 20. Consequently, the central region of the molded film 20 can be melted without melting the portions of the molded film 20 gripped by the chuck unit 120 and their vicinity.

Moreover, as the upper portion of the blowing unit 110 is provided with the transparent cover 113, it is possible to proceed to stretching operations after direct visual observation is conducted from the top of the blowing unit 110 to confirm that the molded film 20 has melted.

The blowing unit 130 is the component which blows hot air to the molded film 20 from below. The blowing unit 130 is provided with a hot-air inlet 131 which introduces hot air into an interior 130a, a hot-air blow plate 135 in which blow ports 135a are formed for blowing out hot air, and air guide plates 132, 133, and 134 which direct the hot air to the blow ports 135a in the interior 130a. Openings 132a, 133a, and 134a are respectively formed in the air guide plates 132, 133, and 134.

Figure 3:
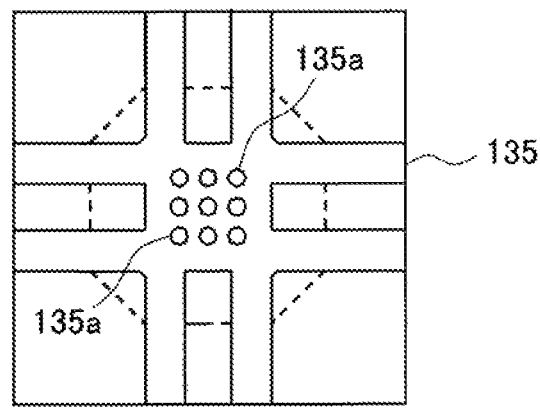
FIG. 3 is a plan view which views the lower hot-air blowing unit of the stretching machine of FIG. 2 from the chuck unit.

In this example, as shown in FIG. 3, nine blow ports 135a are formed in the hot-air blow plate 135. These blow ports 135a are respectively formed at positions where the hot air is blown only to portions of the molded film 20 excluding the portions gripped by the chuck unit 120 and their vicinity. That is, all of the blow ports 135a are formed at positions corresponding to the central region of the unstretched molded film 20.

The number, size, positions and the like of the openings 132a, 133a, and 134a respectively formed in the air guide plates 132, 133, and 134 are calculated by computer simulation so that the hot air can be vertically blown out from the blow ports 135a in an efficient manner.

With the blowing unit 130, hot air is introduced from the hot-air inlet 131, sequentially passes through the openings 132a, 133a, and 134a formed in the air guide plates 132, 133, and 134 in the interior 130a, and is blown out from the blow ports 135a provided in the hot-air blow plate 135. By this means, the hot-air is blown only to the central region of the molded film 20. Thus, with the stretching machine 101, the hot air from the blowing unit 110 and the hot air from the blowing unit 130 are not blown to the portions of the molded film 20 gripped by the chuck unit 120 or their vicinity. Consequently, in a state where those portions are maintained at a temperature lower than the melting point of the resin composition, the central region of the molded film 20 alone is melted.

In step (II), melt stretching is conducted by stretching the molded film 20 by the chuck unit 120 in a state where the ambient temperature of the molded film 20, i.e., the temperature at which film is in a melted state in step (II) (hereinafter "temperature $T_3$") is maintained for a fixed period of time at a temperature where the molded film 20 melts—i.e., at a temperature above the melting point of the resin composition—due to the hot air from the blowing unit 110 and the blowing unit 130 so that the portions of the molded film 20 other than those gripped by the chuck unit 120 are melted. If melt stretching is performed by such partial hot-air blowing, melt stretching that does not break the molded film 20 is facilitated, promoting obtainment of high-strength PTFE stretched film with excellent transparency.

The temperature $T_3$ is preferably 330-420° C., and more preferably 350-400° C. If the temperature $T_3$ is 330° C. or more, the molded film can be stretched in a melted state, with the result that obtainment of PTFE stretched film of high tensile strength at break is facilitated. If the temperature $T_3$ is 420° C. or less, inhibition of degradation of the obtained PTFE stretched film due to thermal decomposition is facilitated.

The time for which the molded film 20 is maintained at the temperature $T_3$ in step (II) is preferably 0.1-100 minutes, and more preferably 1-10 minutes. If the aforementioned time is 1 minute or more, thorough melting of the molded film 20 is facilitated. If the aforementioned time is 100 minutes or less, productivity is enhanced.

Stretching may be conducted as uniaxial stretching, or as biaxial stretching. In the case of biaxial stretching, the method of conducting stretching sequentially one axis at a time (sequential biaxial stretching) is acceptable, and the method of stretching the two axes simultaneously (simultaneous biaxial stretching) is also acceptable, but from the standpoint of facilitating stable obtainment of PTFE stretched film of high tensile strength at break and excellent transparency, simultaneous biaxial stretching is preferable. Simultaneous biaxial stretching is preferably conducted after the molded film is melted by the blowing of hot air, as with the aforementioned stretching machine 101.

Stretching speed during melt stretching of the molded film 20 is preferably 1-1000 mm/minute, and more preferably 10-100 mm/minute. If stretching speed is 1 mm/minute or more, productivity is enhanced. If stretching speed is 1000 mm/minute or less, manufacture of PTFE stretched film without break is facilitated.

Stretching ratio in step (II) will vary according to the temperature $T_3$, but 1.1-fold to 10-fold is preferable, and 2-fold to 5-fold is more preferable. If stretching ratio is 1.1-fold or more, obtainment of PTFE stretched film of high tensile strength at break is facilitated. If stretching ratio is 10-fold or less, stable manufacture of PTFE stretched film without breaking the film is facilitated. Stretching ratio is ratio of the length along the stretched axis of the PTFE stretched film after stretching, relative to the length along the stretched axis of the molded film 20 before stretching.

With biaxial stretching, the respective stretching ratios along the two axes that are vertical and horizontal are preferably both within the aforementioned range. From the standpoint of obtaining PTFE stretched film of higher tensile strength at break, it is particularly preferable to have a biaxial stretching ratio of 2.5-fold or more in the case where the molded film 20 is subjected to simultaneous biaxial stretching. From the standpoint of facilitating obtainment of PTFE stretched film with uniform tensile strength at break and transparency in the respective vertical and horizontal directions of the film, stretching ratio along the respective axes is preferably identical, and within the aforementioned range.

According to the manufacturing method described above, PTFE stretched film is obtained which has a high maximum stretching ratio during melt stretching, which has excellent processability, and which has a high tensile strength at break compared to conventional PTFE stretched film. The causes thereof would seem to be as follows.

In the case where high-molecular-weight PTFE (A) in which Mn is $5.0 \times 10^6$ or more is used alone, the entangled long molecular chain of the PTFE (A) is difficult to disentangle during the melt stretching of step (II), and the film breaks at low stretching ratios, thus high tensile strength at break is not obtainable. On the other hand, in the case where high-molecular-weight PTFE (B) in which Mn is $1.0 \times 10^6$ to $4.0 \times 10^6$ is used alone, it is easy to disentangle the molecular chain during the melt stretching of step (II), and it is easy to orient the molecular chain in the direction of stretching. However, molecular ends exist in large numbers due to the short molecular chain, thus high tensile strength at break is not obtainable. In contrast, with the melt stretching of molded film using a resin composition containing PTFE (A) and PTFE (B) in the manufacturing method of the present invention, it is thought that the existence of the short-chain PTFE (B) facilitates disentanglement of the entangled molecular chain of the PTFE (A), which facilitates orientation in the direction of stretching, thereby constituting a skeleton that enables obtainment of high tensile strength at break.

The manufacturing method of the present invention is not limited to the above-described method. For example, a method is also acceptable in which, after obtainment of molded film in step (I), adhesiveness among the particles may be further raised by subjecting the said molded film to rolling, and subsequently conducting step (II).

In addition, the stretching machine used in step (II) is not limited to the above-described stretching machine 101. For example, a stretching machine may be used which has chucks that respectively grip the four corners of the molded film, and which is capable of uniaxial stretching in either the vertical or horizontal direction of the said molded film, or a stretching machine may be used which is capable of uniaxial stretching by gripping two opposite sides of the molded film. It is also acceptable to use a stretching machine which has a heating mechanism for heating the entire molded film, and a cooling mechanism for cooling the portions of the said molded film that are gripped by the chuck unit.

PTFE Stretched Film

The PTFE stretched film of the present invention is film which is manufactured by the above-described manufacturing method, and which has high tensile strength at break.

The thickness of the PTFE stretched film may be suitably determined according to application, but 0.001-10 mm is preferable, and 0.01-1 mm is more preferable. If thickness is 0.001 mm or more, it is easy to obtain uniform PTFE stretched film that is free of ruptures such as pinholes and fissures in the film. If thickness is 10 mm or less, the tensile strength at break of the PTFE stretched film is enhanced.

The thickness of the PTFE stretched film may be controlled by adjusting the thickness of the molded film, and the stretching ratio of melt stretching.

The tensile strength at break of the PTFE stretched film of the present invention is preferably 30 MPa or more, and more preferably 50 MPa or more, provided that the tensile strength at break of PTFE stretched film is a value obtained by subjecting a specimen excised from PTFE stretched film to tensile testing at room temperature by a tensile tester. The PTFE stretched film obtained by biaxial stretching conforms to JIS K7127:1999, the specimen size is the JIS dumbbell #5 shape (12.5 mm straight-line segment, 4 mm width), and tensile speed is 20 mm/minute. With respect to uniaxial stretching, specimens are used that are cut to a length of 30 mm from PTFE stretched film obtained by conducting uniaxial stretching of JIS dumbbell #5 shape specimens in the same lengthwise direction, and tensile speed is set to 0.6 mm/minute. As the tensile tester, one may cite, for example, the Tensilon Universal Tester RTC-1325A (manufactured by Orientec Co., Ltd.).

Tensile strength at break may be adjusted by the Mn of the employed PTFE (A) and PTFE (B), by pressing pressure ($V_1$, $V_2$), and pressing temperature ($T_1$, $T_2$) in step (I), by melted temperature, and stretching ratio in step (II), and the like.

The haze (turbidity) of the PTFE stretched film obtained by biaxial stretching is preferably 50% or less, and more preferably 45% or less, provided that the haze of the PTFE stretched film signifies a value measured according to JIS K7105 "Test Method for Optical properties of Plastic."

Haze may be adjusted by the Mn of the employed PTFE (A) and PTFE (B), by pressing pressure ($V_1$, $V_2$), and pressing temperature ($T_1$, $T_2$) in step (I), by melted temperature, and stretching ratio in step (II), and the like.

WORKING EXAMPLES

The present invention is described in detail below by means of working examples, but the present invention is not limited by the following description.

Manufacture of PTFE and Resin Composition

Example 1

A pressure vessel with a 100 L agitator was charged with 60 L of water, 60 g of ammonium perfluoro-3,6-dioxaoctanoate which is a fluorine-containing surfactant, and 750 g of paraffin wax. Internal temperature and pressure in the vessel were respectively set to 70° C. and 1.7 MPa, 5 g of 2-peroxide succinate which is a radical polymerization initiator were added, and polymerization was started. Polymerization was continued while introducing gaseous TFE so that internal pressure in the vessel was maintained. At the point where the volume of introduced TFE was 26 kg, polymerization was stopped by cooling the internal temperature of the pressure vessel to room temperature, the unreacted gas was released, and the pressure vessel was opened to obtain an emulsion of PTFE (A1) (hereinafter "Emulsion 1"). The solid content concentration of Emulsion 1 was 28 mass %.

After diluting Emulsion 1 to a solid content concentration of 10 mass %, the PTFE (A1) was solidified by mechanical agitation, water was filtered out, and drying was conducted for 7 hours at 200° C. to obtain fine powder of the PTFE (A1). The Mn of the obtained PTFE (A1) was $1\times10^7$.

Example 2

Manufacture of PTFE

A pressure vessel with a 100 L agitator was charged with 60 L of water, 65 g of ammonium perfluoro-3,6-dioxaoctanoate which is a fluorine-containing surfactant, and 750 g of paraffin wax. Internal temperature and pressure in the vessel were respectively set to 70° C. and 1.7 MPa, 25 g of 2-peroxide succinate which is a radical polymerization initiator were added, and polymerization was started. Polymerization was continued while introducing gaseous TFE so that internal pressure in the vessel was maintained. At the point where the volume of introduced TFE was 26 kg, polymerization was stopped by cooling the internal temperature of the pressure vessel to room temperature, the unreacted gas was released, and the pressure vessel was opened to obtain an emulsion of PTFE (B1) (hereinafter "Emulsion 2"). The solid content concentration of Emulsion 2 was 28 mass %.

After diluting Emulsion 2 to a solid content concentration of 10 mass %, the PTFE (B1) was solidified by mechanical agitation, water was filtered out, and drying was conducted for 7 hours at 200° C. to obtain fine powder of the PTFE (B1). The Mn of the obtained PTFE (B1) was $2\times10^6$.

Example 3

Manufacture of Resin Composition

The Emulsion 1 obtained in Example 1 and the Emulsion 2 obtained in Example 2 were mixed so that the solid content ratio (A1/B1) of the PTFE (A1) and the PTFE (B1) was 75/25 to obtain an emulsion of a resin composition I in which the PTFE (A1) and the PTFE (B1) were distributed on the secondary particle level. Next, after diluting the obtained emulsion with water to a solid content concentration of 10 mass %, the resin composition I was solidified by mechanical agitation, water was filtered out, and drying was conducted for 7 hours at 200° C. to obtain fine powder of the resin composition I.

Example 4

Manufacture of Resin Composition

Fine powder of a resin composition II was obtained in the same manner as Example 3, except that Emulsion 1 and Emulsion 2 were mixed so that the solid content ratio (A1/B1) of the PTFE (A1) and the PTFE (B1) was 50/50.

Example 5

Manufacture of Resin Composition

Fine powder of a resin composition III was obtained in the same manner as Example 3, except that Emulsion 1 and Emulsion 2 were mixed so that the solid content ratio (A1/B1) of the PTFE (A1) and the PTFE (B1) was 25/75.

Measurement of Number Average Molecular Weight (Mn)

The Mn of the PTFE (A1) and the PTFE (B1) manufactured in each example is molecular weight obtained from crystallization heat estimated by conducting cooling measurement by DSC after melting the raw material PTFE powder, according to the method described in the following document.

Document: Suwa, T.; Takehisa, M.; Machi, S., J. Appl. Polym. Sci. vol. 17, p. 3253 (1973).

Manufacture of PTFE Stretched Film by Biaxial Stretching

Example 6

Step (I-1)

As shown in FIG. 1, the releasable polyimide film 12 of 125 μm thickness (brand name "Upilex-125," manufactured by Ube Industries, Ltd.) was placed on the discoid stainless steel plate 11 of 100 mm diameter×2 mm thickness. The discoid stainless steel plate 13 of 100 mm diameter×4 mm thickness in which the rectangular opening 13a of 70 mm length×70 mm width was formed was further placed thereon, and 4.5 g of the resin composition II (solid content ratio (A1/B1)=50/50) obtained in Example 4 were put into the opening 13a. Next, the releasable polyimide film 14 of 125 μm thickness (brand name "Upilex-1255," manufactured by Ube Industries, Ltd.) was placed on top of the discoid stainless steel plate 13, and the discoid stainless steel plate 15 of 100 mm diameter×2 mm thickness was further placed thereon to obtain a laminate (the laminate 1) for film molding.

Next, using a vacuum pressing machine (manufactured by Baldwin Co., Ltd.) having a cylinder that exerts pressure on a top plate and a bottom plate, and between the said top plate and bottom plate, the laminate 1 was placed at room temperature between the top plate and bottom plate of the pressing machine that was installed in a vacuum chamber, and pressure inside the vacuum chamber was reduced to $1\times10^{-1}$ Torr by rotary pump. Subsequently, the temperature of the top plate and bottom plate of the pressing machine (the ambient temperature $T_1$ of the resin composition II) was raised to 80° C. over a 10-minute period, and maintained without alteration for 10 minutes. In this state, the resin composition II was pressed at 2.2314 MPa (the first pressure $V_1$, with a cylinder pressure of 30 MPa) by the vacuum pressing machine.

Step (I-2)

While maintaining the reduced-pressure atmosphere as is, temperature within the vacuum chamber (the ambient temperature $T_2$ of the resin composition II) was raised to 370° C., and pressure from the vacuum pressing machine (the second pressure $V_2$, with a cylinder pressure of 40 MPa) was raised to 2.9752 MPa, and was maintained in this state for 5 minutes to conduct compression molding.

Step (I-3)

While maintaining the reduced-pressure atmosphere and the pressed state at the second pressure $V_2$ of step (I-2), temperature inside the vacuum chamber was cooled to room temperature by cooling, the laminate 1 was removed from the vacuum chamber, and the laminate 1 was delaminated to obtain the molded film.

With respect to the first pressure $V_1$ and the second pressure $V_2$, effective pressure is respectively converted from the cylinder pressure by the following method.

(Effective pressure)=(cylinder pressure)×[(cylinder area)/(pressing plate area)]

Step (II)

The molded film obtained in step (I) was cut to 45 mm length×45 mm width, and was subjected to biaxial stretching using the stretching machine 101 (manufactured by Island Industry Co., Ltd.) of FIG. 2 endowed with heat resistance so as to be capable of withstanding stretching up to 400° C. The obtained molded film was gripped by the chuck unit 120, the molded film was melted by respectively blowing hot air for 5 minutes at 380° C. from the blowing unit 110 and the blowing unit 130, and it was visually confirmed from the top cover 113 side that a melted state had been attained, after which simultaneous biaxial stretching was conducted in the vertical and horizontal directions at a stretching speed of 30 mm/minute. When melt stretching was conducted until holes opened up in the molded film, the maximum stretching ratio was 2.9-fold×2.9-fold. Setting stretching ratio at 2.9-fold×2.9-fold, the identical biaxial stretching was again conducted to obtain PTFE stretched film, and tensile strength at break and haze were measured.

Example 7

Molded film was obtained in the same manner as Example 6, except that the PTFE (A1) obtained in Example 1 was used instead of the resin composition II. When melt stretching was subsequently conducted in the same manner as Example 6 until holes opened up in the obtained molded film, maximum stretching ratio was 2.7-fold×2.7-fold. Setting stretching ratio at 2.7-fold×2.7-fold, the identical biaxial stretching was again conducted to obtain PTFE stretched film, and tensile strength at break and haze were measured.

Example 8

Molded film was obtained in the same manner as Example 6, except that the PTFE (B1) obtained in Example 2 was used instead of the resin composition II. When melt stretching was subsequently conducted in the same manner as Example 6 until holes opened up in the molded film, maximum stretching ratio was 2.4-fold×2.4-fold. Setting stretching ratio at 2.4-fold×2.4-fold, the identical biaxial stretching was again conducted to obtain PTFE stretched film, and tensile strength at break and haze were measured.

Measurement Methods (Tensile Strength at Break)

Specimens were cut in JIS dumbbell #5 shape (straight-line segment: 12.5 mm, width: 4 mm) from the obtained PTFE stretched film (thickness: 46 μm) in accordance with JIS K7127:1999, and tensile strength at break (unit: MPa) was measured at room temperature using a Tensilon Universal Tester RTC-1325A (manufactured by Orientec Co., Ltd.). Tensile speed was set to 20 mm/minute.

(Haze)

The haze (turbidity, unit: %) of the obtained PTFE stretched film (thickness: 46 μm) was measured according to JIS K7105:1981 "Test Method for Optical Properties of Plastic."

The results of measurements of the PTFE stretched films obtained in Examples 6-8 are shown in Table 1. For comparison, tensile strength at break was measured for the samples of Example 6 that were melt stretched at stretching ratios of 2.4-fold×2.4-fold and 2.7-fold×2.7-fold from the molded film, and for the sample of Example 7 that was melt stretched at a stretching ratio of 2.4-fold×2.4-fold from the molded film. The relation between stretching ratio and tensile strength at break is shown in FIG. 4.

TABLE 1

| | | Example 6 | Example 7 | Example 8 |
|---|---|---|---|---|
| Employed polymer | Type | Resin composition II | PTFE (A1) | PTFE (B1) |
| | Solid content ratio (A1/B1) | 50/50 | 100/0 | 0/100 |
| Step (I) | Pressure $V_1$ (MPa) | 2.2314 | 2.2314 | 2.2314 |
| | Temperature $T_1$ (° C.) | 80 | 80 | 80 |
| | Pressure $V_1$ (MPa) | 2.9752 | 2.9752 | 2.9752 |
| | Temperature $T_2$ (° C.) | 370 | 370 | 370 |
| Step (II) | Temperature $T_3$ (° C.) | 380 | 380 | 380 |
| | Stretching ratio (ratio) | 2.9 × 2.9 | 2.7 × 2.7 | 2.4 × 2.4 |
| Tensile strength at break (MPa) | | 169.69 | 110.24 | 40.192 |
| Haze (%) | | 42.9 | 12.1 | 95.4 |

Figure 4:
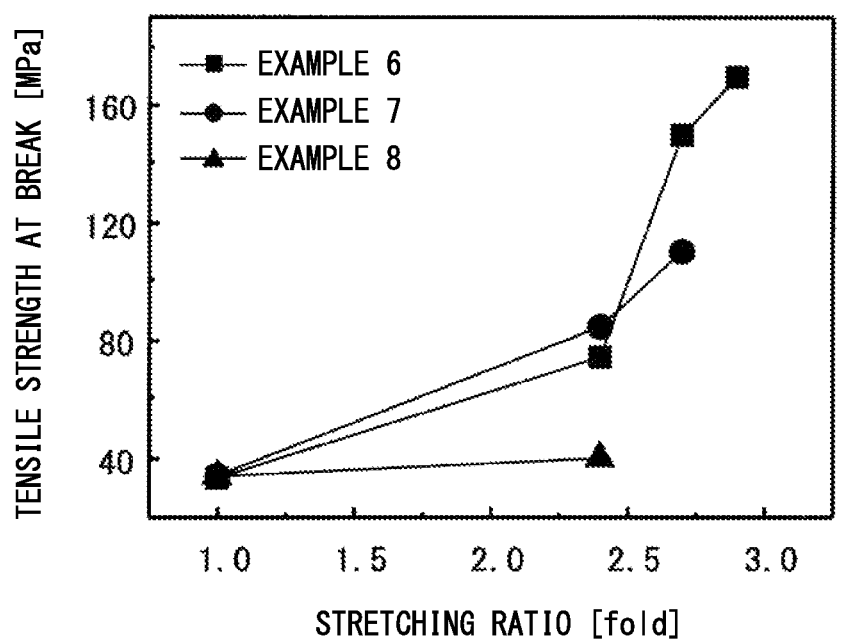
FIG. 4 is a graph which illustrates the relation between stretching ratio and tensile strength at break in Examples 6-8.

As shown in Table 1 and FIG. 4, compared to the PTFE stretched films of Example 7 using the PTFE (A1) and Example 8 using the PTFE (B1), the PTFE stretched film of Example 6 using the resin composition II has a large maximum stretching ratio, and a high tensile strength at break. Moreover, as shown in FIG. 4, when the stretching ratio of the PTFE stretched film of Example 6 using the resin composition II becomes 2.5-fold or more, tensile strength at break is markedly enhanced.

Example 9

With respect to specimens respectively cut to 25 mm length×25 mm width from molded film (solid content ratio (A/B)=50/50) obtained in the same manner as Example 6, and from molded film obtained in the same manner as Example 6 except that the resin composition I (solid content ratio (A/B)=75/25) obtained in Example 3 or the resin composition III (solid content ratio (A/B)=25/75) obtained in Example 5 was used instead of the resin composition II, simultaneous biaxial stretching was conducted in a melted state in the same manner as Example 6 until holes opened up in the film to obtain the maximum stretching ratio. The results are shown in Table 2.

TABLE 2

| Resin composition | I | II | III |
|---|---|---|---|
| Solid content ratio (A1/B1) | 75/25 | 50/50 | 25/75 |
| Maximum stretching ratio (ratio) | 2.86 × 2.86 | 2.97 × 2.97 | 2.95 × 2.95 |

As shown in Table 2, with the melt stretching of molded film from resin compositions I-III that have solid content ratios (A/B) of 75/25, 50/50, and 25/75, it was possible to obtain approximately identical melt stretching with a maximum stretching ratio on the order of 2.9-fold×2.9-fold in each case.

Manufacture of PTFE Stretched Film by Uniaxial Stretching

Example 10

Step (I)

The laminate 1 for film molding was obtained with interposition of the resin composition II (solid content ratio (A/B)=50/50) in the same manner as Example 6.

Next, using a vacuum pressing machine (manufactured by Baldwin Co., Ltd.) having a cylinder that exerts pressure on a top plate and a bottom plate, and between the said top plate and bottom plate, the laminate 1 was placed at room temperature between the top plate and bottom plate of the pressing machine that was installed in a vacuum chamber, and pressure inside the vacuum chamber was reduced to $1 \times 10^{-1}$ Torr by rotary pump. Subsequently, the temperature of the top plate and bottom plate of the pressing machine (the ambient temperature $T_2$ of the resin composition II) was raised to 370° C., and maintained at that temperature for 5 minutes, after which compression molding was conducted by pressing the resin composition II at 2.2314 MPa (cylinder pressure: 30 MPa) by the vacuum pressing machine. Next, while maintaining the reduced-pressure atmosphere and the pressed state by the vacuum pressing machine, temperature inside the vacuum chamber was cooled to room temperature by cooling, the laminate 1 was removed from the vacuum chamber, and the laminate 1 was delaminated to obtain the molded film.

Step (II)

Figure 5:
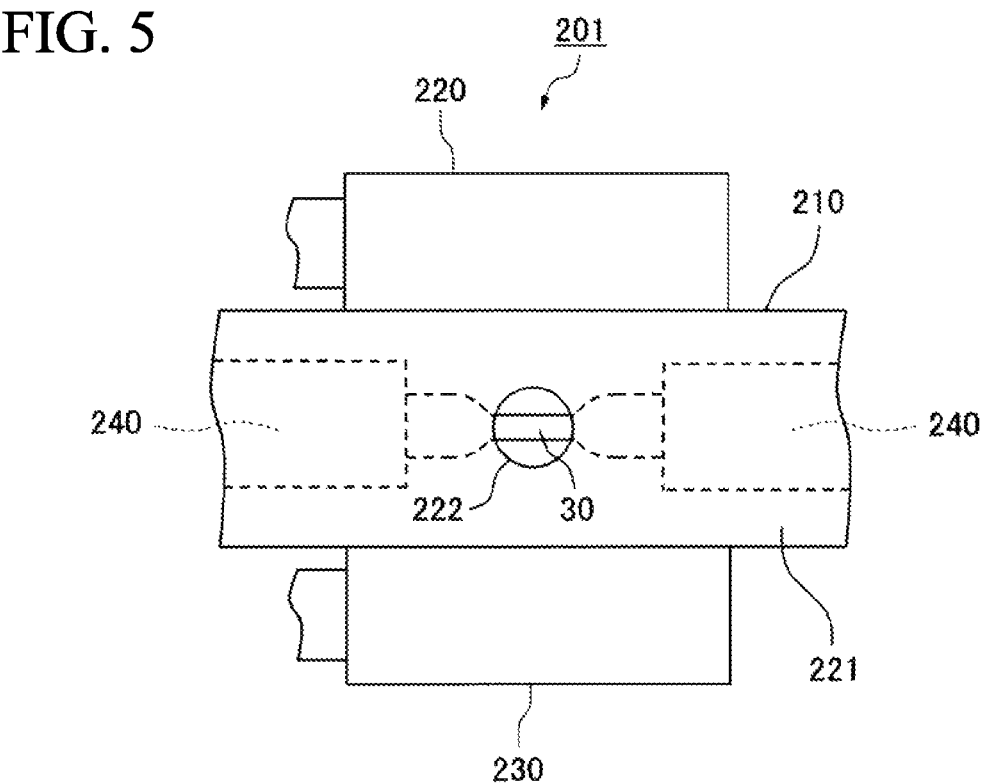
FIG. 5 is a frontal view which shows a stretching machine used in Examples 10-12.
Figure 6:
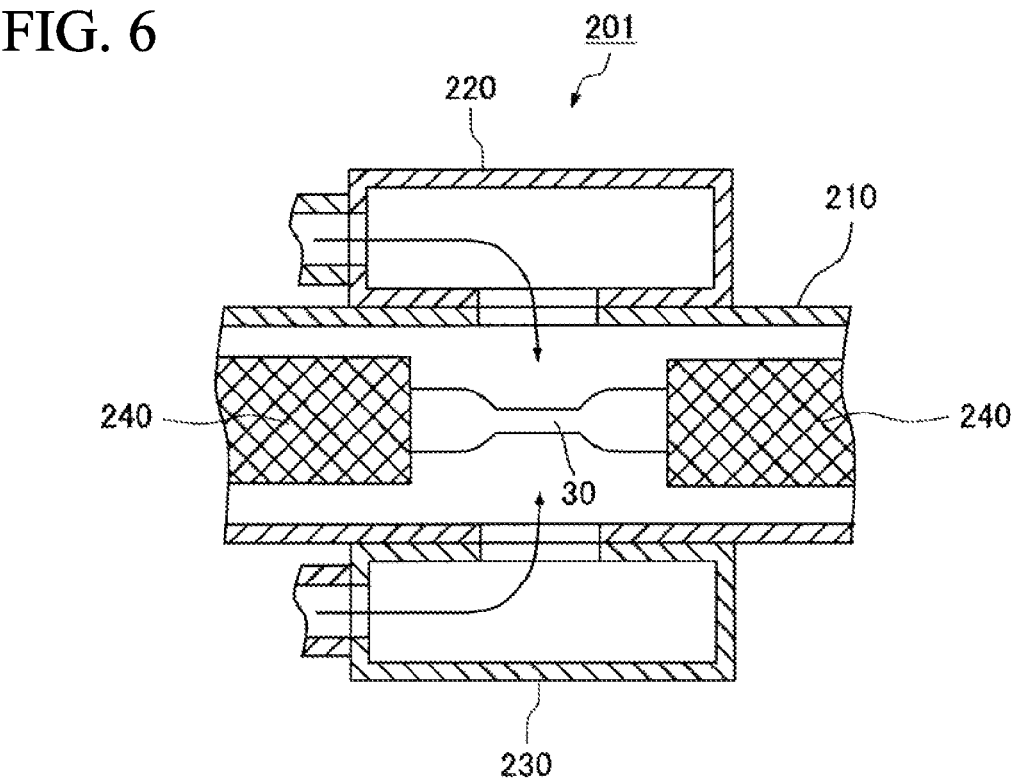
FIG. 6 is a cross-sectional view which shows a stretching machine used in Examples 10-12.

Specimens were cut in JIS dumbbell #5 shape (straight-line segment: 12.5 mm, width: 4 mm) from the molded film obtained in step (I), and uniaxial stretching was conducted using a self-built stretching machine 201 illustrated in FIG. 5 and FIG. 6 endowed with heat resistance so as to be capable of stretching until 400° C.

The stretching machine 201 was provided with a stretching furnace 210, an upper hot-air blowing unit 220 (hereinafter "blowing unit 220") and a lower hot-air blowing unit (hereinafter "blowing unit 230") which blow hot air into the stretching furnace 210, and a chuck unit 240 which grips a specimen 30 inside the stretching furnace 210. A transparent window 222 was formed on a front face 221 of the stretching furnace 210 to enable checking of the melting state of the specimen 30 from the outside. The window 222 was sealed with polyimide film (thickness: 25 μm).

The handle-like portions of the specimen 30 were gripped by the chuck unit 240, the specimen 30 was melted by having hot air respectively blown for 5 minutes at 370° C. from the blowing unit 220 and the blowing unit 230, and it was visually confirmed from the window 222 that a melted state had been attained, after which uniaxial stretching was conducted in the lengthwise direction at a stretching speed of 24 mm/minute to obtain the PTFE stretched film. Stretching ratio was set to 3.0-fold. The tensile strength at break of the obtained PTFE stretched film was measured.

Example 11

PTFE stretched film was obtained in the same manner as Example 10 except that the PTFE (A1) obtained in Example 1 was used instead of the resin composition II, and tensile strength at break was measured.

Example 12

PTFE stretched film was obtained in the same manner as Example 10 except that the PTFE (B1) obtained in Example 2 was used instead of the resin composition II, and tensile strength at break was measured.

Measurement Method (Tensile Strength at Break)

Specimens of 30 mm length were cut from the obtained PTFE stretched film, and tensile strength at break (unit: MPa) was measured at room temperature using a Tensilon Universal Tester RTC-1325A (manufactured by Orientec Co., Ltd.). Tensile speed was set to 0.6 mm/minute.

Amorphous Orientation in the Melt Stretching Process

Uniaxial stretching of the specimens 30 of Examples 10-12 was conducted in a state where the aforementioned stretching machine 201 was installed on the Spring-8 BL40B2 Beamline of the Japan Synchrotron Radiation Research Institute, and in-process measurement was conducted in the stretching process using synchrotron radiation. WAXD images in the stretching process were continuously recorded using a CCD camera C4880 (manufactured by Hamamatsu Photonics K.K.). Exposure time was 0.2 seconds, and the time required for transfer to the recording medium (hard disk) of the recorded WAXD images was 5.5 seconds.

Profiles of the specimens 30 in the lengthwise direction (meridional direction) and the widthwise direction (equatorial direction) were respectively excised from the WAXD image at each time, and the Voigt function was used to compute integrated intensity by separating the profile in the equatorial direction into an amorphous scattering peak and a pseudo-hexagonal 100-plane reflection peak. The integrated intensity of the amorphous scattering peak of the meridional profile was also obtained.

Figure 7:
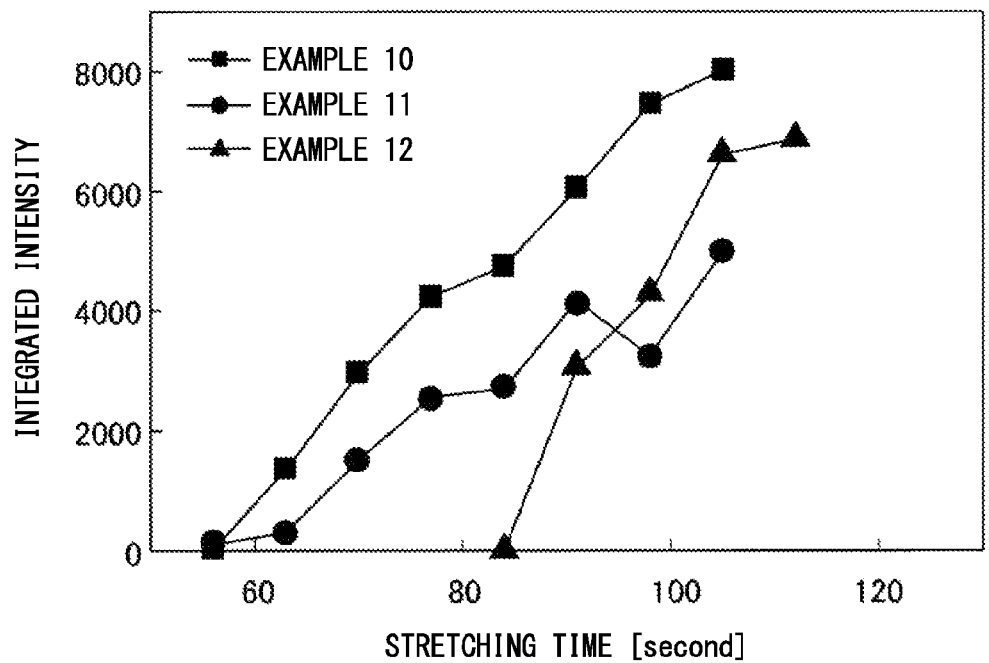
FIG. 7 is a graph which plots the integrated intensity of a pseudo-hexagonal 100-plane reflection peak in the equatorial direction against stretching time in Examples 10-12.

Of these, the integrated intensity of the equatorial pseudo-hexagonal 100-plane reflection peak was plotted against stretching time (FIG. 7). These values constitute an index that quantitatively expresses the state of orientation (crystal orientation) of the crystal chain along the direction of stretching.

Figure 8:
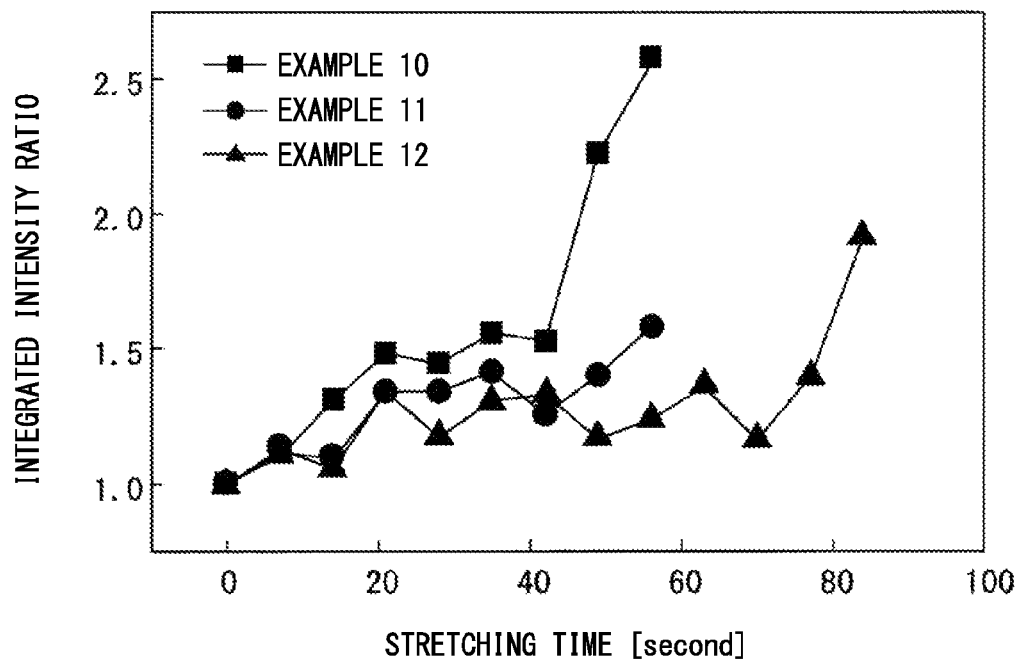
FIG. 8 is a graph which illustrates the relation between stretching time and the integrated intensity ratio of amorphous scatterings in Examples 10-12.

In addition, the ratio of the integrated intensity of the equatorial amorphous scattering peak and the integrated intensity of the meridional amorphous scattering peak was plotted against stretching time (FIG. 8). These values constitute an index that quantitatively expresses the state of orientation (amorphous orientation) of the amorphous chain along the direction of stretching.

In FIG. 8, the integrated intensity ratio of equatorial and meridional amorphous scattering of the specimens 30 while not yet stretched was considered to be 1.0. A larger integrated intensity of the pseudo-hexagonal 100-plane reflection peak (FIG. 7) and a larger integrated intensity ratio of the amorphous scatterings (FIG. 8) signify that the higher crystal chain and the higher amorphous chain of the molded film are oriented along the direction of stretching.

The tensile strength at breaks of the PTFE stretched films of Examples 10-12 are shown in Table 3.

TABLE 3

|  |  | Example 10 | Example 11 | Example 12 |
|---|---|---|---|---|
| Employed polymer | Type | Resin composition II | PTFE (A1) | PTFE (B1) |
|  | Solid content ratio (A1/B1) | 50/50 | 100/0 | 0/100 |
| Tensile strength at break (MPa) |  | 242 | 193 | 128 |

As shown in Table 3, the PTFE stretched film of Example 10 using the resin composition II has a higher tensile strength at break than the PTFE stretched films of Example 11 using the PTFE (A1) and of Example 12 using the PTFE (B1).

As shown in FIG. 7, compared to Example 11 which used the high-molecular weight PTFE (A1) and Example 12 which used the low-molecular weight PTFE (B1), with the Example 10 which used the resin composition II containing the PTFE (A1) and the PTFE (B1), the integrated intensity of the pseudo-hexagonal 100-plane reflection peak rapidly rose in the vicinity of 60 seconds of stretching time. As shown in FIG. 8, the integrated intensity ratio of the amorphous scatterings rapidly rose from the vicinity of 40 seconds of stretching time in Example 10. This suggests that, in the stretching of the molded film of Example 10 using the resin composition II, a rapid orienting of amorphous components in the direction of stretching and a concomitant crystallization develop at 40-60 seconds of stretching time. As to the causes thereof, it would seem that, due to the presence of the low-molecular weight PTFE (B1), disentangling of the entangled molecular chain of the high-molecular weight PTFE (A1) is facilitated, and the molecular chain of the PTFE (A1) tends to be highly orientated in a stretched state, and easily crystallized.

INDUSTRIAL APPLICABILITY

As the PTFE stretched film manufactured according to the method of the present invention has a high tensile strength at break, it may be optimally used, for example, in dome roofing material and the like.

DESCRIPTION OF THE REFERENCE SYMBOLS 1 laminate
11 discoid stainless steel plate
12 releasable polyimide film
13 discoid stainless steel plate
13a opening port
14 releasable polyimide film
15 discoid stainless steel plate
20 molded film
101 stretching machine
110 upper hot-air blowing unit
112 blow port
120 chuck unit
130 lower hot-air blowing unit
135 hot-air blow plate
135a blow port
201 stretching machine
210 stretching furnace
220 upper hot-air blowing unit
230 lower hot-air blowing unit
240 chuck unit

The invention claimed is:

1. A method of manufacture of polytetrafluoroethylene stretched film having the following steps (I) and (II), (I) A step in which a resin composition obtained by mixing an emulsion of polytetrafluoroethylene (A) with a number average molecular weight of $5 \times 10^6$ or more and an emulsion of polytetrafluoroethylene (B) with a number average molecular weight of $1 \times 10^6$ to $4 \times 10^6$ so that the solid content ratio (A/B) of the polytetrafluoroethylene (A) and the polytetrafluoroethylene (B) is 99/1 to 10/90, and obtaining a resin composition powder in which polytetrafluoroethylene (A) and polytetrafluoroethylene (B) are mixed on the secondary particle level, by mixing the emulsion of polytetrafluoroethylene (A) and the emulsion of polytetrafluoroethylene (B), and by subsequently aggregating and drying the mixed emulsion, and where the resin composition powder is subjected to compression molding in a melted state under a reduced-pressure atmosphere to obtain a film, wherein said polytetrafluoroethylene (A) and said polytetrafluoroethylene (B) are polytetrafluoroethylene obtained by emulsion polymerization, and (II) A step in which said film is melt stretched, wherein said melt stretching is biaxial stretching, said step (I) comprises step (I-1) in which said resin composition powder is pressed at a first pressure $V_1$ in a range of 0.01-100 MPa for 1-100 minutes in a state where it has been heated to a temperature $T_1$ in a range of 15-150° C. under a reduced-pressure atmosphere, and step (I-2) in which the heated and pressed resin composition in said step (I-1) is further heated at a temperature $T_2$ in a range of 330-420° C. to a melted state, and compression molded at a second pressure $V_2$ in a range of 0.01-100 MPa for 1-100 minutes under a reduced-pressure atmosphere, said reduced-pressure atmosphere in said steps (I-1) and (I-2) is 10 Torr or less, and the difference of said second pressure $V_2$ and said first pressure $V_1$ ($V_2-V_1$) ranges between about 0.1-99 MPa.

2. A method of manufacture of polytetrafluoroethylene stretched film according to claim 1, wherein said step (I) further comprises step (I-3) in which molded film is obtained by cooling in a pressed state under a reduced-pressure atmosphere at 10 Torr or less.

3. The method of manufacture of polytetrafluoroethylene stretched film according to claim 1, wherein an average particle size of the polytetrafluoroethylene (A) in the emulsion of polytetrafluoroethylene (A) is within the range of about 0.03-0.5 μm, and an average particle size of the polytetrafluoroethylene (B) in the emulsion of polytetrafluoroethylene (B) is within the range of about 0.03-0.5 μm.

4. The method of manufacture of polytetrafluoroethylene stretched film according to claim 1, wherein said emulsion polymerization is carried out at a temperature in a range of about 10-95° C. and at a pressure in a range of about 0.5-4.0 MPa and at a time in a range of about 90-520 minutes.

5. The method of manufacture of polytetrafluoroethylene stretched film according to claim 1, wherein a temperature at which the film is in a melted state in said step (II) is within the range of about 330-420° C.

6. The method of manufacture of polytetrafluoroethylene stretched film according to claim 1, wherein said biaxial stretching is comprised of simultaneous biaxial stretching in which said film is in a melted state by hot-air blowing, and two axes of the film are simultaneously stretched.

7. The method of manufacture of polytetrafluoroethylene stretched film according to claim 6, wherein said simultaneous biaxial stretching is carried out at a stretching ratio of about 2.5-fold or more than 2.5-fold by length of the film (mm) in said simultaneous biaxial stretching, wherein the stretching ratio is a ratio of the length along a stretched axis of the film after stretching relative to the length along a stretched axis of the film before stretching, wherein the respective stretching ratios along the two axes that are vertical and horizontal are both within the aforementioned range.

8. The method of manufacture of polytetrafluoroethylene stretched film according to claim 1, wherein said melt stretching is biaxial stretching and conducted according to conditions as follows:
temperature in a range of 330-420° C.
stretching speed in a range of 1-1000 mm/minute, and
stretching ratio in a range of 1.1-10 fold and 1.1-10 fold by length of the film (mm), wherein the stretching ratio is a ratio of the length along a stretched axis of the film after stretching relative to the length along a stretched axis of the film before stretching, wherein the respective stretching ratios along the two axes that are vertical and horizontal are both within the aforementioned range.

9. The method of manufacture of polytetrafluoroethylene stretched film according to claim 8, wherein said melt stretching is conducted according to conditions as follows:
temperature in a range of 380° C.,
stretching speed in a range of 30 mm/minute,
stretching ratio in a range of 2.4-2.9 fold and 2.4-2.9 fold,
said step (I-1) is conducted according to conditions as follows:
reduced pressure atmosphere in a range of $1\times10^{-1}$ Torr or less,
pressing at the first pressure $V_1$ of 2.2 MPa for 10 minutes,
said step (I-2) is conducted according to conditions as follows:
reduced pressure atmosphere of $1\times10^{-1}$ Torr or less,
pressing at the second pressure $V_2$ of 2.9 MPa for 5 minutes, and
the difference of said second pressure $V_2$ and said first pressure $V_1$ ($V_2-V_1$) is 0.7 MPa.

* * * * *